US012392379B2

(12) United States Patent
Olmstead (10) Patent No.: US 12,392,379 B2
(45) Date of Patent: Aug. 19, 2025

(54) KEYLESS SHAFT ASSEMBLY AND KEYLESS DRIVE OR IDLER WHEEL

(71) Applicant: empirical innovations, inc., Dakota Dunes, SD (US)

(72) Inventor: Rocky George Olmstead, Whittemore, IA (US)

(73) Assignee: empirical innovations, inc., Dakota Dunes, SD (US)

( * ) Notice: Subject to any disclaimer, the term of this patent is extended or adjusted under 35 U.S.C. 154(b) by 317 days.

(21) Appl. No.: 18/085,593

(22) Filed: Dec. 21, 2022

(65) Prior Publication Data

US 2024/0209899 A1 Jun. 27, 2024

(51) Int. Cl.
*F16D 1/09* (2006.01)
*F16H 57/00* (2012.01)
*B65G 23/06* (2006.01)

(52) U.S. Cl.
CPC ........... *F16D 1/09* (2013.01); *F16H 57/0025* (2013.01); *B65G 23/06* (2013.01); *F16D 2300/08* (2013.01); *F16D 2300/12* (2013.01); *Y10T 403/7056* (2015.01)

(58) Field of Classification Search
CPC ............... F16D 1/09; F16D 2001/0903; F16D 2300/08; F16D 2300/12; F16H 57/0025; B65G 23/06; Y10T 403/10; Y10T 403/7056
USPC ......................................................... 464/182
See application file for complete search history.

(56) References Cited

U.S. PATENT DOCUMENTS

| 3,782,841 | A | * | 1/1974 | Winckelhaus ...... B60B 27/0026 464/182 |
| 3,847,495 | A | | 11/1974 | Peter |
| 3,958,888 | A | | 5/1976 | Mullenberg |
| 3,990,804 | A | | 11/1976 | Peter |
| 4,140,413 | A | | 2/1979 | Conrad |
| 5,105,936 | A | | 4/1992 | Stapper |
| 5,156,263 | A | | 10/1992 | Ledet |
| 5,947,265 | A | | 9/1999 | Merten |
| 8,701,875 | B2 | | 4/2014 | Arai |

(Continued)

FOREIGN PATENT DOCUMENTS

| CN | 87217240 Y | 2/1990 |
| CN | 101307792 A | 11/2008 |

(Continued)

OTHER PUBLICATIONS

International Search Report and Written Opinion in PCT/US2023/036682 issued Feb. 21, 2024.
Fenner Drives product catalog, Jan. 2018, pp. 9, 24-55.

*Primary Examiner* — Richard M Lorence
(74) *Attorney, Agent, or Firm* — Fish & Richardson P.C.

(57) ABSTRACT

First and second wheel body components each define a respective wheel body component longitudinal opening and are adapted to be placed in a connected position. A portion of the first wheel body component opening is defined by an inwardly facing and tapered first compression surface. When the first and second wheel body components are placed together in the connected position with a hollow sleeve received in a sleeve operating position within the first wheel body component, the two wheel body components and sleeve together form a shaft-mountable wheel that may be installed on an appropriately sized shaft.

20 Claims, 6 Drawing Sheets

(56) References Cited

U.S. PATENT DOCUMENTS

| | | |
|---|---|---|
| 9,360,099 B2 | 6/2016 | Wang |
| 2014/0064834 A1 | 3/2014 | Jeggle |
| 2017/0073166 A1 | 3/2017 | Soderstrom |

FOREIGN PATENT DOCUMENTS

| | | |
|---|---|---|
| CN | 201458261 U | 5/2010 |
| CN | 205871305 U | 1/2017 |
| DE | 29915798 U1 | 3/2000 |
| JP | 2006207692 A | 8/2006 |

\* cited by examiner

KEYLESS SHAFT ASSEMBLY AND KEYLESS DRIVE OR IDLER WHEEL

TECHNICAL FIELD OF THE INVENTION

This disclosure relates to conveyors and other systems in which an endless component such as a chain or belt is driven over a rotating shaft. More particularly, the disclosure relates to drive or idler wheels that may be secured to a shaft to drive or guide an endless component such as a chain or belt.

BACKGROUND OF THE INVENTION

Conveyor systems commonly include an endless belt that is driven over two or more rotating conveyor shafts. Drive wheels mounted on the rotating shafts are used for some types of conveyors to apply a driving force to the belt as the shafts rotate. A drive feature is commonly included on the periphery of a drive wheel to facilitate applying the driving or guiding forces to the belt. For example, a series of cogs arranged around the periphery of a drive wheel may serve as a drive feature and cooperate with corresponding structure on the belt to provide the desired driving or guiding function. A drive wheel must be fixed at a particular angular orientation on the conveyor shaft so as to rotate with the shaft and may also be fixed at a desired longitudinal position along the conveyor shaft. Aside from drive wheels, idler wheels may be mounted on a shaft in a conveyor system to provide support for the belt along the upper or lower flight of the belt and/or to guide the belt in a desired lateral position relative to the shaft. A shaft assembly including one or more idler wheels may also be configured to ensure a desired tension in an endless belt or chain. Idler wheels may or may not have drive features such as cogs.

In order to fix a drive or idler wheel in a given angular orientation on the conveyor shaft, a shaft receiving opening of the wheel may be provided with one or more structures that cooperate with corresponding structures on the shaft. For example, a conveyor shaft may be provided with a rigid projection (referred to as a "key" or "spline") running longitudinally along the length of the shaft, while the wheel may include a groove sized to receive the shaft key/spline with close tolerance. The key and groove may also be reversed so that the groove is formed longitudinally along the conveyor shaft and the key comprises part of the drive or idler wheel and projects into a shaft-receiving opening of the wheel.

While these "keyed" arrangements for fixing a drive or idler wheel to a shaft are effective for ensuring that the wheel rotates with the shaft, there are disadvantages associated with these keyed arrangements. One disadvantage is that the key and groove structures complicate fabrication of both the wheel and the shaft. Another disadvantage of a keyed arrangement for fixing a drive or idler wheel to a shaft is that the arrangement makes it difficult to provide a seal between the wheel and the shaft. Such a seal is particularly important for conveyors used in a sanitary setting such as in a food processing operation. It is desirable in these settings to reduce or eliminate crevices between parts and other areas where material may collect and become difficult to remove in periodic clean in place operations.

SUMMARY OF THE INVENTION

The present disclosure encompasses "keyless" shaft-mountable drive or idler wheels that do not require a keyed or grooved shaft. The present disclosure further encompasses keyless shaft assemblies for use in conveyors and similar systems and also encompasses methods for securing a drive wheel on a rotatable shaft. In this disclosure and the accompanying claims, the designation "shaft-mountable wheel" is used to describe a wheel that is adapted to be mounted on a shaft so as to rotate with the shaft regardless of whether the shaft itself is driven by a suitable motor or is undriven. The designation "shaft-mountable wheel" encompasses both drive wheels and idler wheels with peripheral drive or guide features such as cogs and also encompasses idler wheels that have an outer surface with no drive or guide features. Although shaft-mountable wheels and shaft assemblies according to this disclosure are particularly suited for use in conveyor systems, the shaft-mountable wheels and shaft assemblies set out in the following claims are not limited to conveyor applications.

Shaft-mountable wheels according to a first aspect of the present invention include separate first and second wheel body components and a hollow sleeve. In some embodiments a drive feature is located on an exterior surface of at least one of the first and second wheel body components. The first and second wheel body components each define a respective wheel body component opening extending along a respective wheel body component longitudinal axis from an inner end to an outer end and are adapted to be placed in a connected position with the two inner ends facing each other. A portion of the first wheel body component opening is defined by an inwardly facing first compression surface that tapers narrower in the direction from the inner end of the first wheel body component to the outer end of the first wheel body component. The hollow sleeve extends along a sleeve longitudinal axis and has a sleeve first section having an inwardly facing shaft gripping surface and an outwardly facing, tapered loading surface. The shaft gripping surface of the sleeve first section defines a portion of a shaft receiving passage through the sleeve.

When the first and second wheel body components are placed together in the connected position with the sleeve first section received in a sleeve first section operating position within the first wheel body component, the three components form a shaft-mountable wheel that may be installed on shaft that is appropriately sized for the hollow sleeve. In particular, when the two wheel body components are placed in the connected position with the first sleeve section in the first sleeve section operating position, the first compression surface of the first wheel body presses against the loading surface of the sleeve first section with a sleeve first section gripping force. When the shaft is received through the hollow sleeve, this gripping force is ultimately applied to the shaft to fix the shaft-mountable wheel in a desired angular orientation and longitudinal position on the shaft. No key feature is required on the shaft and thus a shaft-mountable wheel according to this first aspect avoids the manufacturing complexity associated with providing a key on the shaft and a corresponding feature on the shaft-mountable wheel. Also, the gripping force applied between the first wheel body component, sleeve, and shaft forms a seal that prevents material in the operating environment from collecting on interior surfaces of the shaft-mountable wheel assembly. This seal is dependent upon placing the two wheel body components in the connected position and is thus created automatically when the shaft-mountable wheel is installed on the shaft. Another advantage of a shaft-mountable wheel in accordance with the present invention is that the structure can be produced with a diameter only a slightly larger than the diameter of the shaft on which it is to be mounted. Thus shaft-mountable wheels in accordance with the invention are suitable for low-profile applications, that is, applications where the difference between the shaft diameter and wheel diameter must be kept relatively small.

In some implementations the second wheel body component also includes an inwardly facing compression surface providing a second compression surface for the shaft-mountable wheel similar to the first compression surface associated with the first wheel body component. In these implementations the hollow sleeve may include a sleeve second section, that, similarly to the sleeve first section, has an inwardly facing shaft gripping surface and an outwardly facing, tapered loading surface. When the first and second wheel body components of these implementations are placed together in the connected position with the sleeve properly positioned within the two wheel body components, the first compression surface of the first wheel body component presses against the loading surface of the sleeve first section with the sleeve first section gripping force and the second compression surface of the second wheel body component presses against the loading surface of the sleeve second section with a sleeve second section gripping force. Thus these embodiments can provide a fixing force along two different sections of the sleeve to fix the shaft-mountable wheel in a desired angular orientation and longitudinal position on a shaft. These embodiments also provide a seal against the shaft at each of the two wheel body components.

In some embodiments of a shaft-mountable wheel according to this first aspect, the drive feature includes a series of cogs positioned on an outer circumference of one or both of the first and second wheel body components. Other embodiments may include other types of drive features such as one or more grooves (V-shaped grooves for example) for receiving a belt.

Implementations of a shaft-mountable wheel in accordance with the first aspect of the invention may incorporate a sealing arrangement with the two wheel body component inner ends to provide a peripheral seal when the wheel body components are in the connected position. In these implementations at least one of the inner surfaces may include a peripheral sealing element receiving groove configured to receive a ring-shaped sealing element. The sealing element placed in the groove may be adapted to deform as it is compressed to provide the desired peripheral seal.

Embodiments of a shaft-mountable wheel in accordance with the first aspect of the invention may include a connecting arrangement for connecting the two wheel body components in the desired connected position. Such a connecting arrangement may include at least three through holes formed in one the first and second wheel body components and at least three corresponding female threaded receivers in the other wheel body component. The through holes are substantially evenly spaced apart at different angular orientations about the longitudinal axis of the respective wheel body component and each extend parallel to the longitudinal axis of the wheel body component. The female threaded receivers are substantially evenly spaced apart about the circumference of that respective wheel body component in position to each align with a respective one of the through holes when the first and second wheel body components are in the connected position. A suitably threaded bolt may be inserted through each through hole and threaded into the respective female threaded receiver to connect the two wheel body components together in the connected position.

Implementations of a shaft-mountable wheel in accordance with the first aspect of the invention may also include a spreader arrangement to help separate the first and second wheel body components from the connected position as desired to remove or reposition the shaft-mountable wheel. Such a spreader arrangement may include two or more spreader passages on each wheel body component, each extending longitudinally and positioned to align with a spreader passage on the opposite wheel body component. The use of the spreader passages will be described below in connection with the drawings.

A second aspect of the invention includes shaft assemblies, each having an elongated shaft on which are mounted two or more shaft-mountable wheels according to the first aspect of the invention. Each of the two or more mounted shaft-mountable wheels may include any of the above-described forms or another form consistent with the first aspect.

A third aspect of the invention encompasses methods for securing a shaft-mountable wheel to a cylindrical shaft, particularly, a cylindrical keyless shaft. Methods according to this third aspect of the invention include sliding a hollow sleeve along a longitudinal axis of the cylindrical shaft to a desired wheel position and sliding first and second wheel body components longitudinally with respect to the cylindrical shaft to a capture position in which the sleeve in the desired wheel position is captured between the first and second wheel body components. The sleeve includes a tapered sleeve first section with an inwardly facing shaft gripping surface and an outwardly facing loading surface. In the capture position an inner end of the first wheel body component faces an inner end of the second wheel body component and an inwardly facing first compression surface of the first wheel body component abuts at least a portion of the loading surface of the sleeve first section. Methods according to this third aspect of the invention further include connecting the two wheel body components together with a connection force applied parallel to the shaft longitudinal axis. This connection force causes the first compression surface to press against the loading surface of the sleeve first section and thereby cause the shaft gripping surface of the sleeve first section to apply a gripping force to the cylindrical shaft sufficient to fix the sleeve and wheel body components relative to the cylindrical shaft.

Although sliding the sleeve into position on the shaft and sliding the two wheel body components into position on the shaft may be performed in accordance with the invention as separate steps, other method implementations may be performed with the sleeve and wheel body components connected together, albeit not with the wheel body components connected with the connecting force. In these implementations sliding the sleeve longitudinally along the cylindrical shaft to the desired wheel position and sliding the first and second wheel body components longitudinally with respect to the cylindrical shaft to the capture position are performed simultaneously.

These and other aspects, advantages, and features of the invention will be apparent from the following description of representative embodiments, considered along with the accompanying drawings.

DESCRIPTION OF REPRESENTATIVE EMBODIMENTS

Figure 1:
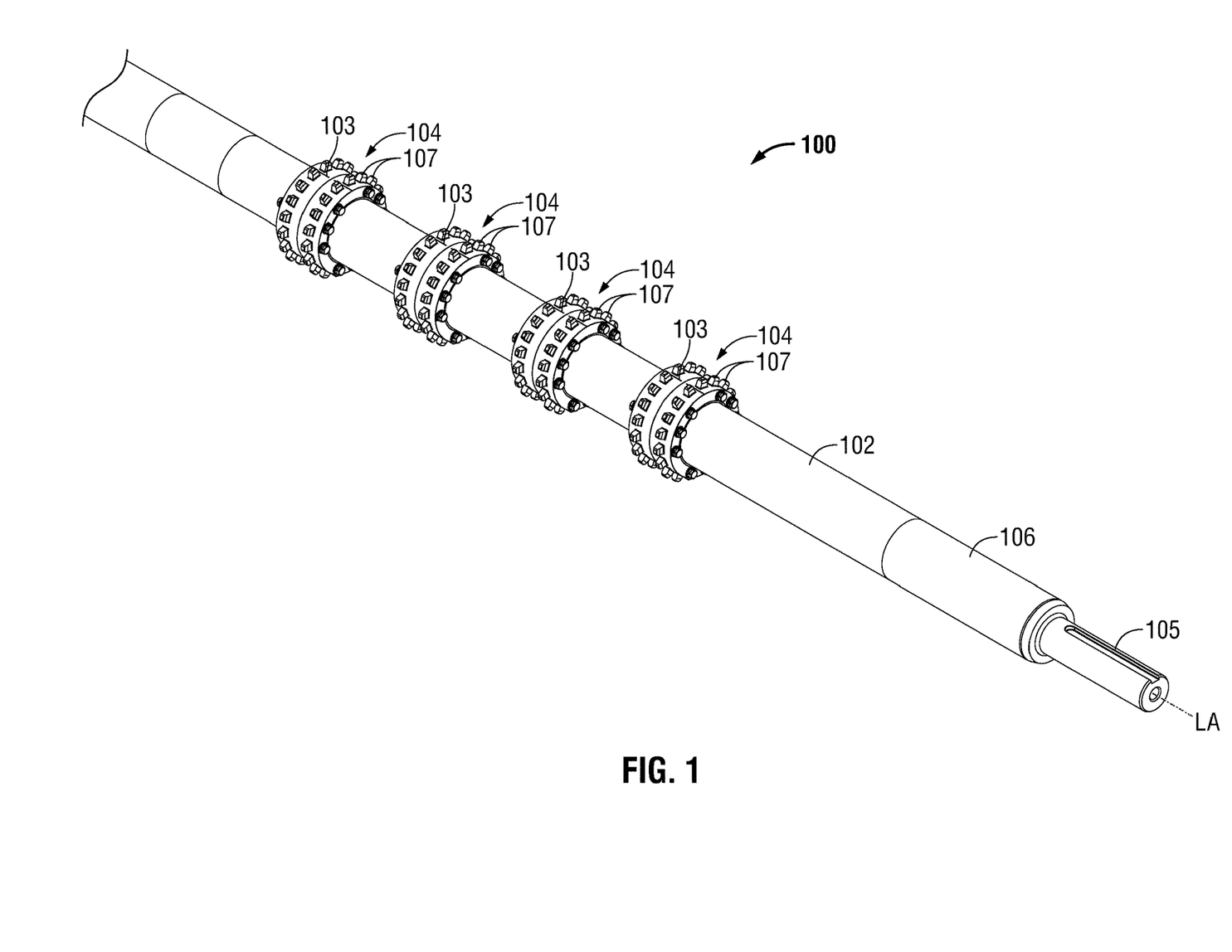
FIG. 1 is an isometric view of a portion of a shaft assembly in accordance with an aspect of the invention.
Figure 2:
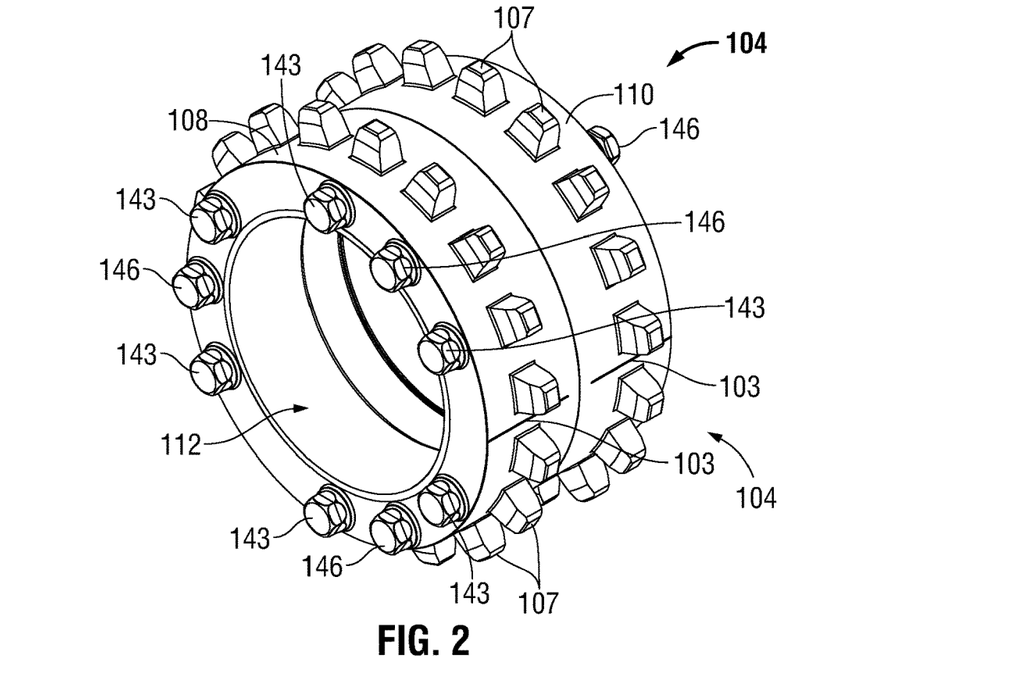
FIG. 2 is an isometric view of a first side of an example shaft-mountable wheel embodying principles of the invention.
Figure 3:
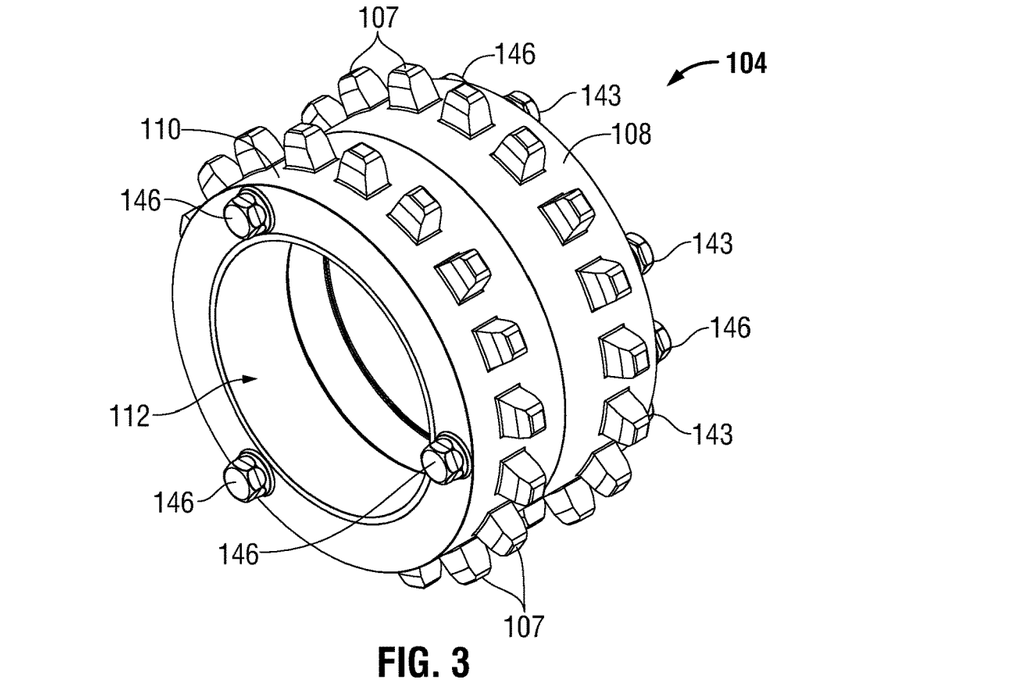
FIG. 3 is an isometric view of a second side of the shaft-mountable wheel shown in FIG. 2.

Referring to FIG. 1 a shaft assembly 100 includes a shaft 102 extending along a longitudinal axis LA. The portion of shaft assembly 100 shown in FIG. 1 includes four shaft-mountable wheels 104 installed at different longitudinal positions along shaft 102. The four shaft-mountable wheels 104 are all aligned at a desired angular orientation about the shaft with the help of alignment features 103 formed on the shaft-mountable wheels. It will be appreciated that additional shaft-mountable wheels 104 may be installed on portions of shaft 102 not shown in FIG. 1. Also, fewer shaft-mountable wheels 104 may be installed in a shaft assembly in accordance with the present invention. The example shaft 102 shown in FIG. 1 includes a shaft drive end with a key 105 so as to accept a suitable drive gear or other element through which a rotational force may be applied to the shaft. Shaft 102 also includes rotary bearings at each end with bearing 106 visible at the shaft end shown in FIG. 1. As noted in the summary section above, a shaft assembly within the scope of the present claims may not be directly driven so as to rotate about the shaft longitudinal axis. In these cases the shaft portion of the shaft assembly may not include any structure or configuration to facilitate applying a rotational force directly to the shaft. A shaft assembly in these cases may include no keyed drive end such as that shown in FIG. 1.

A given conveyor system, for example, may include two or more shaft assemblies such as assembly 100 spaced apart along a flight of an endless conveyor belt (not shown). The example shaft-mountable wheels 104 include drive features that are intended to cooperate with suitable features of the conveyor belt to guide and/or drive the conveyor belt along the conveyor flight. Because a drive feature may function to guide and/or drive the belt, a drive feature as described herein and as set forth in the following claims may be associated with either a drive wheel or an idler wheel. The particular drive features included on shaft-mountable wheels 104 are cogs 107 which each project from the outer circumferential surface of the respective wheel. Cogs 107 are suitable for use with a chain-type conveyor belt made up of interconnected links with which the cogs 107 cooperate for guiding and/or driving the belt. As noted above, a shaft-mountable wheel embodying principles of the present invention is not limited to drive features comprising cogs as shown in the example wheels 104.

Figure 7:
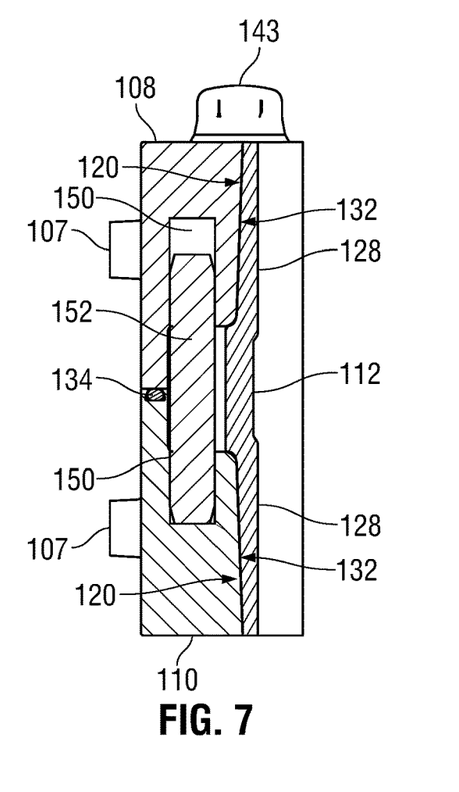
FIG. 7 is a section view taken along line 7-7 in FIG. 4.
Figure 8:
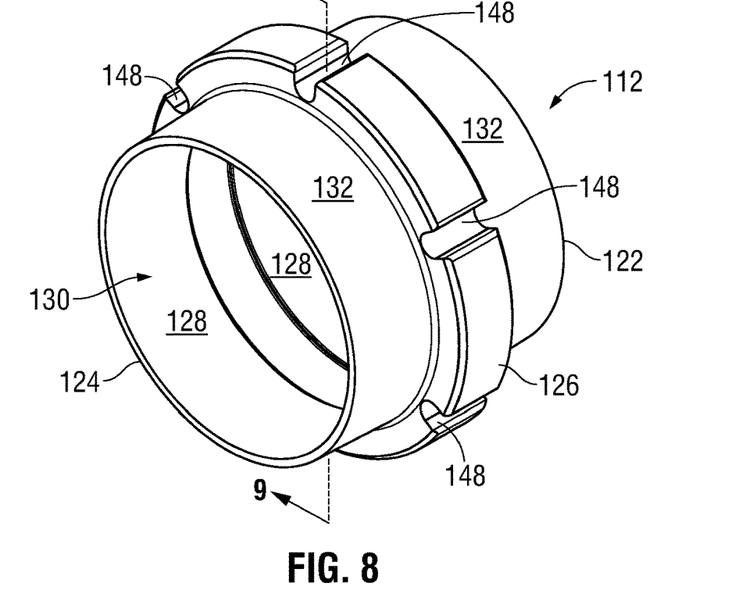
FIG. 8 is an isometric view of the sleeve used in the example shaft-mountable wheel shown in FIGS. 2 and 3.
Figure 9:
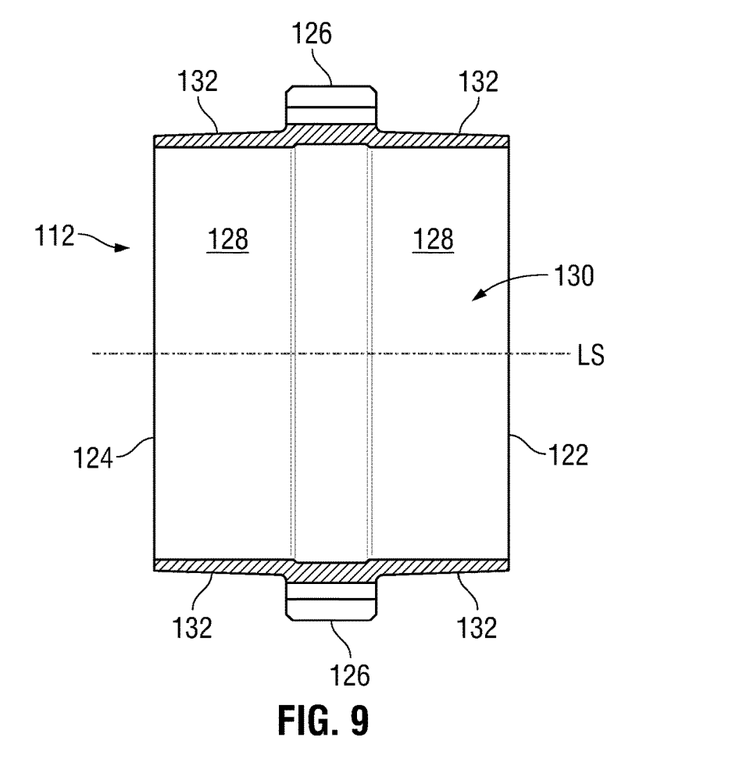
FIG. 9 is a section view taken along line 9-9 in FIG. 8.

Further details of example shaft-mountable wheel 104 are shown in FIGS. 2-9. The views of FIGS. 2-5 in particular show that shaft-mountable wheel 104 includes a first wheel body component 108 and a second wheel body component 110. These two wheel body components 108 and 110 are separate components but are shown in the figures in a connected position to form shaft-mountable wheel 104. In this connected position, the longitudinal axis of each wheel body component 108 and 110 aligns with wheel axis LW shown in the section view of FIG. 5. Shaft-mountable wheel 104 also includes a hollow sleeve 112 shown in FIGS. 2-5 in a sleeve operating position in which it is captured between the two wheel body components 108 and 110. FIGS. 8 and 9 show sleeve 112 separately from wheel body components 108 and 110.

Figure 5:
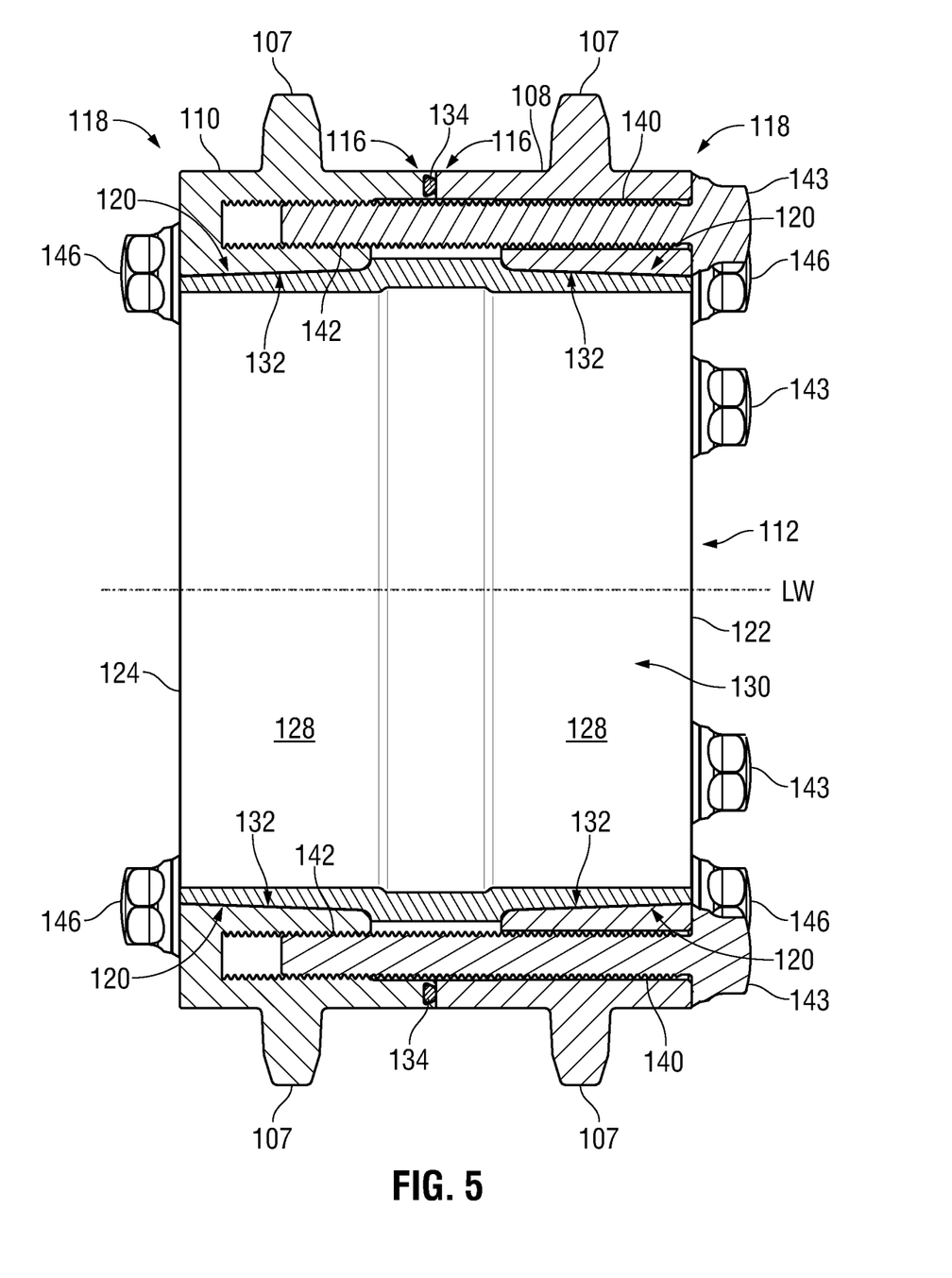
FIG. 5 is a section view taken along line 5-5 in FIG. 4.
Figure 6:
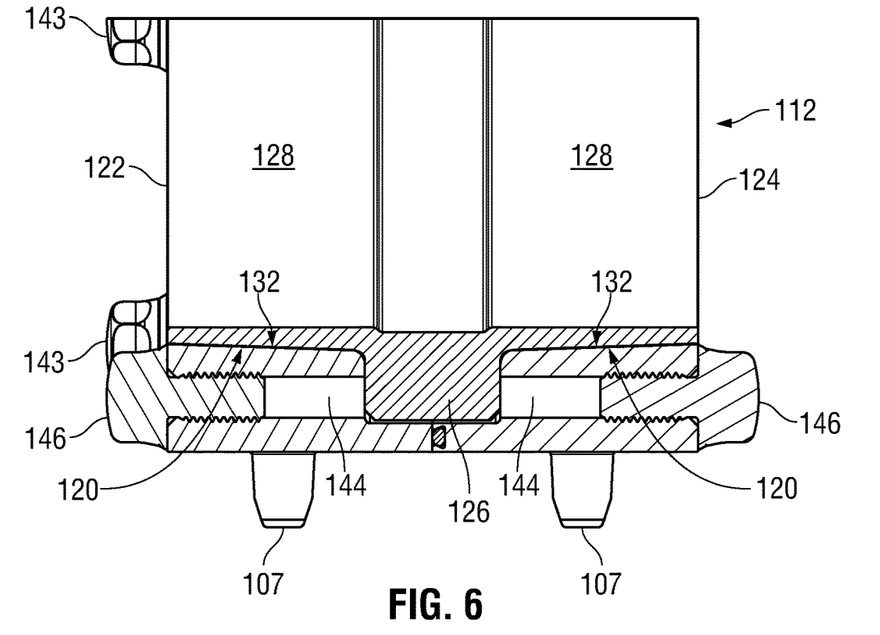
FIG. 6 is a section view taken along line 6-6 in FIG. 4.

As perhaps shown best in FIG. 5, each wheel body component 108 and 110 extends from a respective inner end 116 to an outer end 118. In the connected position shown in FIG. 5, the inner ends 116 of the two wheel body components 108 and 110 face each other. Each wheel body component 108 and 110 in this example shaft-mountable wheel 104 includes an inwardly facing compression surface 120 that is tapered narrower in the direction from the respective outer end 118 to the respective inner end 116.

The example sleeve 112 shown in the figures extends along a sleeve longitudinal axis LS (FIG. 8) and includes a sleeve first section 122 and a sleeve second section 124 separated by an intermediate section 126 (best shown in FIG. 8). Sleeve first section 122 and sleeve second section 124 each include a respective shaft gripping surface 128 that faces inwardly toward the longitudinal axis LS and defines a portion of a shaft receiving passage 130 through sleeve 112. Referring particularly to FIGS. 5 and 9, sleeve first section 122 and sleeve second section 124 each also include an outwardly facing loading surface 132. Each of these loading surfaces 132 is tapered narrower in the direction away from intermediate section 126 for the respective sleeve section.

As shown in FIG. 5, when sleeve 112 is located in a sleeve operating position captured within the two wheel body components 108 and 110, sleeve first section 122 is in an operating position within first wheel body component 108 and sleeve second section 124 is in an operating position within second wheel body component 110. In the operating position of first sleeve section 122 in first wheel body component 108, the loading surface 132 of the sleeve section faces the compression surface 120 of first wheel body component 108. The loading surface 132 of sleeve second section 124 in its operating position similarly faces the compression surface 120 of second wheel body component 110. In the illustrated example embodiment, the taper of the compression surfaces 120 and taper of the loading surfaces 132 essentially match so that the two surfaces abut each other when sleeve 112 is properly captured and the wheel body components 108 and 110 are in the connected position. In some implementations, the loading surfaces 132 may be configured to be slightly larger than a match to the taper of the wheel body compression sections to increase the force applied to the loading surfaces 132 as the two wheel body components 108 and 110 are brought together to the connected position shown in FIG. 5 for example.

FIG. 5 also shows that example shaft-mountable wheel 104 includes a sealing arrangement to provide a seal between the wheel body component inner ends 116 when the two wheel body components 108 and 110 are in the connected position. In this example, the sealing arrangement is formed by a peripheral groove on the face of inner end 116 of second wheel body component 110 and a ring-shaped peripheral sealing element 134 received in that groove. When the two wheel body components 108 and 110 are placed together in the connected position shown in FIGS. 2, 3, and 5, the peripheral sealing element 134 provides a seal between the two inner ends 116 around the entire periphery of shaft-mountable wheel 104.

The example shaft-mountable wheel 104 shown in FIGS. 1-7 includes a connecting arrangement for connecting the two wheel body components 108 and 110 in the connected position. As shown best in the section view of FIG. 5, the connecting arrangement in this example includes through holes 140 formed in first wheel body component 108 and extending parallel to axis LW. Second wheel body component 110 includes threaded receivers 142, each arranged to align with a respective one of the through holes 140. In this connecting arrangement, a suitable threaded fastener 143 may be inserted into each through hole 140 and threaded into the corresponding threaded receiver (connector receiver) 142 to make the connection between the two wheel body components 108 and 110. In the illustrated example shaft-mountable wheel 104, two sets of three through holes 140 and corresponding threaded receivers 142 are provided to produce the desired connection between the two wheel body components 108 and 110. Each of the three through holes 140 and threaded receivers 142 in a given set are spaced apart evenly at 120° about longitudinal axis LW in this example. This arrangement of through holes 140 in threaded receivers 142 facilitates and even compression around the entire circumference of the shaft-mountable wheel to provide the desired sealing and compression described further below.

Example shaft-mountable wheel 104 also includes a spreader arrangement for facilitating the separation of the two wheel components 108 and 110 from the connected position shown in the figures. The spreader arrangement in this example includes a number of spreader passages 144 formed in each of the first and second wheel body components 108 and 110 respectively at different angular orientations around axis LW. The figures show the each of these spreader passages 144 are female threaded holes each receiving a spreader passage sealing element 146 comprising a suitable screw in this embodiment.

FIGS. 8 and 9 show that the sleeve intermediate section 126 has a larger diameter than the sleeve first section 122 and sleeve second section 124. In order to accommodate the fasteners 143 shown best in FIG. 5, sleeve 112 includes sleeve through passages 148 in the sleeve intermediate section 126. These sleeve through passages 148 comprise grooves formed in sleeve 112 in this illustrated example and are positioned to align with a respective one of the fasteners 143 when sleeve 112 is received in the operating position captured between the first and second wheel body component 108 and 110.

Figure 4:
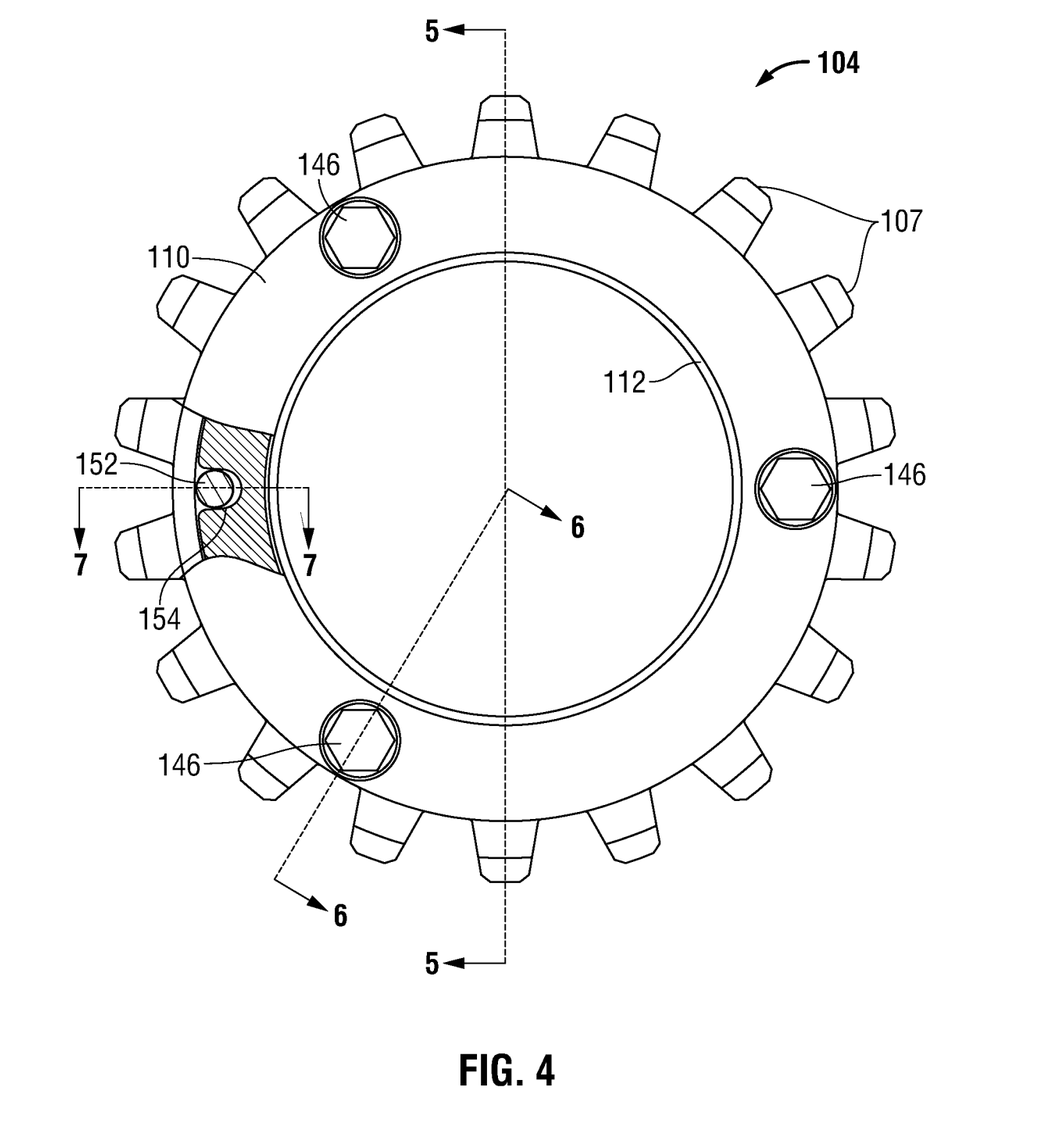
FIG. 4 is a side view of the forward-facing side of the shaft-mountable wheel shown in FIG. 3.

Referring now to FIG. 7, the example shaft-mountable wheel 104 also includes a retainer arrangement for retaining the two wheel body components 108 and 110 adjacent to one another even when fasteners 143 are removed. The example retainer arrangement includes a retainer pin 152, each and of which is tightly received in a respective retainer pin receiver 150 formed in each of the first and second wheel body components 108 and 110. It will be noted that the example sleeve with the larger diameter intermediate section 126 will also include a retainer pin through passage 154 to accommodate retainer pin 152. This retainer pin through passage 154 is shown in FIG. 4.

Methods of securing shaft-mountable wheel 104 to shaft 102 shown in FIG. 1 may now be described with reference to the figures. In some embodiments, first and second wheel body components 108 and 110 are arranged together with sleeve 112 generally in the position shown in FIGS. 2, 3, and 5 but with the fasteners 143 not fully threaded down into the respective receiver 142 sufficiently to place the first and second wheel body components 108 and 110 in the final connected position. This leaves sleeve 112, and particularly sleeve first and second sections in a condition in which shaft 102 can slide through shaft receiving passage 130. In this condition, the components of shaft-mountable wheel 104, namely, sleeve 112 and first and second wheel body components 108 and 110 may be slid on as a unit onto shaft 102 until the components are in the desired longitudinal position on shaft 102. Once the components are in the desired longitudinal position and angular orientation on shaft 102, each fastener 143 may be threaded further into the respective threaded receiver 142 to bring the first and second wheel body components 108 and 110 closer together and into the final connected position. As the two wheel body components 108 and 110 are brought together to the final connected position, the taper of compression surfaces 120 apply a gripping force inwardly against the adjacent loading surface 132 of sleeve 112. The sleeve first and second sections 122 and 124 transfer this gripping force to shaft gripping surfaces 128 to press those surfaces tightly against the outer surface of shaft 102. This gripping force applied between the wheel body components 108 and 110 and sleeve 112, and ultimately to shaft 102 not only provides a force necessary to fix shaft-mountable wheel 104 in a desired angular orientation on shaft 102 while the shaft operates in a given system, but also simultaneously provides a seal between shaft-mountable wheel 104 and shaft 102. Also, placing the first and second wheel body components 108 and 110 in the connected position on the shaft by torquing the fasteners 143 to the desired extent simultaneously produces a seal between the inner ends 116 of the two wheel body components 108 and 110.

In the event it is necessary to move shaft-mountable wheel 104 to a different angular and/or longitudinal position on shaft 102, the fasteners 143 may be loosened sufficiently to release the gripping force applied by the shaft gripping surfaces 128 to the outer surface of shaft 102 and allow shaft-mountable wheel 104 to be moved relative to shaft 102. Since the sleeve 112 and two wheel body components 108 and 110 were held tightly together in the connected position, there may be significant frictional resistance to separating the two wheel body components 108 and 110. In this case, each spreader passage sealing element 146 may be removed from its respective spreader passage 144 and then a longer threaded element (not shown) may be threaded into each spreader passage 144 until the threaded element makes contact with sleeve intermediate section 126. At this point, threading the fastener further has the effect of pushing the respective wheel body component 108 or 110 away from the sleeve intermediate section 126 to slide the respective wheel body component outwardly to the point where it releases sufficient gripping force to allow the shaft-mountable wheel 104 to be moved longitudinally along shaft 102 and/or rotated relative to shaft 102. This application of spreader force may be required for both of the first and second wheel body components 108 and 110. In any event, once shaft-mountable wheel 104 is moved to the different desired position on shaft 102, the fasteners 143 tightened again to place the two wheel body components 108 and 110 in the connected position with each shaft gripping surface 128 providing the desired gripping force on shaft 102. Any spreading passage sealing elements 146 that were removed in the process of relocating shaft-mountable wheel 104 may be replaced to seal off the spreader passages.

Embodiments within the scope of the present invention may include numerous variations on the illustrated shaft-mountable wheel 104 and above-described method. For example, although the illustrated shaft-mountable wheel 104 includes a sleeve section (122 and 124) that cooperates with a compression surface 120 on each wheel body component 108 and 110, other embodiments may include a single sleeve section that cooperates with a compression surface on one of the wheel body components to provide all of the gripping force needed to fix the shaft-mountable wheel in position on a shaft such as shaft 102 and provide the desired sealing between the shaft and shaft-mountable wheel. In these single sleeve gripping surface embodiments, the sleeve may comprise a single sleeve section such as sleeve first section 122 with no sleeve intermediate section (such as 126 in the example shaft-mountable wheel 104) and no sleeve second section (such as 124 in the example shaft-mountable wheel 104).

The various components of a shaft-mountable wheel within the scope of the present invention may be formed from any suitable material or combination of materials. The materials should be selected for compatibility with the application in which the shaft-mountable wheel is used. For example, shaft-mountable wheels in accordance with the invention are particularly suited for use in settings requiring high sanitation standards such as in food handling and processing. For these applications the first and second wheel body components may be formed from a suitable stainless steel or other food handling grade material. The sleeve of a shaft-mountable wheel for these applications may also be formed from a suitable food handling grade material such as polyoxymethylene thermoplastic for example.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, and the like with reference to a given feature are intended only to identify a given feature and distinguish that feature from other features. Unless specifically stated otherwise, such terms are not intended to convey any spatial or temporal relationship for the feature relative to any other feature.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described representative embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A shaft-mountable wheel including:
   (a) separate first and second wheel body components each defining a respective wheel body component opening extending along a respective wheel body component longitudinal axis from an inner end to an outer end of the respective wheel body component, the first and second wheel body components being adapted to be placed in a connected position with the inner end of the first wheel body component facing the inner end of the second wheel body component;
   (b) an inwardly facing first compression surface defining a portion of the first wheel body component opening, the inwardly facing first compression surface tapering narrower in the direction from the inner end of the first wheel body component to the outer end of the first wheel body component;
   (c) a hollow sleeve extending along a sleeve longitudinal axis and having a sleeve first section, the sleeve first section having an inwardly facing shaft gripping surface and an outwardly facing loading surface, the loading surface of the sleeve first section being tapered along the sleeve longitudinal axis and the shaft gripping surface of the sleeve first section defining a portion of a shaft receiving passage through the sleeve;
   (d) a drive feature projecting from at least one of an outer circumferential surface of the first wheel body component and an outer circumferential surface of the second wheel body component; and
   (e) wherein when the first and second wheel body components are placed together in the connected position with the sleeve first section received in a sleeve first section operating position within the first wheel body component, the first compression surface presses against the loading surface of the sleeve first section with a sleeve first section gripping force.

2. The shaft-mountable wheel of claim 1 wherein the drive feature includes a series of cogs positioned on the outer circumferential surface of the first wheel body component, the cogs being spaced apart at different angular orientations about the longitudinal axis of the first wheel body component.

3. The shaft-mountable wheel of claim 1 wherein the inner end of one of the first wheel body component and second wheel body component includes a peripheral sealing element receiving groove configured to receive a ring-shaped sealing element to provide a peripheral seal between the inner end of the first wheel body component and the inner end of the second wheel body component when the first and second wheel body components are placed together in the connected position.

4. The shaft-mountable wheel of claim 1 wherein the shaft gripping surface of the sleeve first section is cylindrical.

5. The shaft-mountable wheel of claim 1 further including a connecting arrangement operable to facilitate connecting the first and second wheel body components in the connected position.

6. The shaft-mountable wheel of claim 5 wherein the connecting arrangement includes:

(a) at least three through holes formed in one the first and second wheel body components, the through holes being substantially evenly spaced apart at different angular orientations about the longitudinal axis of the one of the first and second wheel body components and each extending parallel to the longitudinal axis of the one of the first and second wheel body components; and (b) at least three female threaded connector receivers formed in the other one of the first and second wheel body components, the connector receivers being substantially evenly spaced apart about the circumference of the other one of the first and second wheel body components in position to each align with a respective one of the through holes when the first and second wheel body components are in the connected position.

7. The shaft-mountable wheel of claim 1:

(a) further including two or more first-side spreader passages formed in the first wheel body component, the first-side spreader passages being substantially evenly spaced apart about at different angular orientations about the longitudinal axis of the first wheel body component and each extending longitudinally through the first wheel body component parallel to the longitudinal axis of the first wheel body component;

(b) further including two or more second-side spreader passages formed in the second wheel body component, the second-side spreader passages being substantially evenly spaced apart about the circumference of the second wheel body component in position to each align with a respective one of the first-side spreader passages when the first and second wheel body components are in the connected position; and (c) wherein each first-side spreader passage and each second-side spreader passage is configured to releasably receive and retain a respective spreader passage sealing element.

8. The shaft-mountable wheel of claim 1:

(a) further including an inwardly facing second compression surface defining a portion of the second wheel body component opening, the inwardly facing second compression surface tapering narrower in the direction from the inner end of the second wheel body component to the outer end of the second wheel body component;

(b) wherein the hollow sleeve includes a sleeve second section, the sleeve second section having an inwardly facing shaft gripping surface and an outwardly facing loading surface, the loading surface of the sleeve second section being tapered along the sleeve longitudinal axis and the shaft gripping surface of the sleeve second section defining a portion of the shaft receiving passage through the sleeve;

(c) wherein when the first and second wheel body components are placed together in the connected position with the sleeve first section received in the sleeve first section operating position within the first wheel body component and the sleeve second section received in a sleeve second section operating position within the second wheel body component, the first compression surface of the first wheel body component presses against the loading surface of the sleeve first section with the sleeve first section gripping force and the second compression surface of the second wheel body component presses against the loading surface of the sleeve second section with a sleeve second section gripping force; and (d) wherein the drive feature includes a first portion projecting from the outer circumferential surface of the first wheel body component and a second portion projecting from the outer circumferential surface of the second wheel body component.

9. The shaft-mountable wheel of claim 8 wherein the drive feature first portion includes a first series of cogs spaced apart along the outer circumferential surface of the first wheel body component at different angular orientations about the longitudinal axis of the first wheel body component and the drive feature second portion includes a second series of cogs spaced apart along the outer circumferential surface of the second wheel body component at different angular orientations about the longitudinal axis of the second wheel body component.

10. The shaft-mountable wheel of claim 8 wherein the inner end of one of the first wheel body component and second wheel body component includes a peripheral sealing element receiving groove configured to receive a ring-shaped sealing element to provide a peripheral seal between the inner end of the first wheel body component and the inner end of the second wheel body component when the first and second wheel body components are placed together in the connected position.

11. The shaft-mountable wheel of claim 8 wherein the shaft gripping surface of each of the sleeve first section and the sleeve second section is cylindrical.

12. The shaft-mountable wheel of claim 8 further including a connecting arrangement operable to facilitate connecting the first and second wheel body components in the connected position.

13. The shaft-mountable wheel of claim 12 wherein the connecting arrangement includes:

(a) at least three through holes formed in the first wheel body component, the through holes being substantially evenly spaced apart at different angular orientations about the longitudinal axis of the first wheel body component and each extending longitudinally through the first wheel body component parallel to the longitudinal axis of the first wheel body component; and (b) at least three female threaded connector receivers formed in the second wheel body component, the connector receivers being substantially evenly spaced apart about the circumference of the second wheel body component in position to each align with a respective one of the through holes when the first and second wheel body components are in the connected position.

14. The shaft-mountable wheel of claim 13 wherein:

(a) the first wheel body component includes two sets of three of the through holes, the through holes of each set being spaced apart 120° about the longitudinal axis of the first wheel body component; and (b) the second wheel body component includes two sets of three of the connector receivers.

15. The shaft-mountable wheel of claim 13 wherein the sleeve includes a sleeve intermediate section located between the sleeve first section and the sleeve second section along the sleeve longitudinal axis, the sleeve intermediate section including:

(a) an outer diameter larger than the outer diameter of each of the sleeve first section and sleeve second section and less than the outer diameter of each of the first and second wheel body components; and (b) a respective through passage for each through hole in position to align with the respective through hole when the first and second wheel body components are in the connected position and the sleeve is captured in a sleeve operating position within the first and second wheel body components.

16. The shaft-mountable wheel of claim 8:
(a) further including two or more first-side spreader passages formed in the first wheel body component, the first-side spreader passages being substantially evenly spaced apart at different angular orientations about the longitudinal axis of the first wheel body component and each extending longitudinally through the first wheel body component parallel to the longitudinal axis of the first wheel body component;
(b) further including two or more second-side spreader passages formed in the second wheel body component, the second-side spreader passages being substantially evenly spaced apart about the circumference of the second wheel body component in position to each align with a respective one of the first-side spreader passages when the first and second ring sections are in the connected position; and
(c) wherein each first-side spreader passage and each second-side spreader passage is configured to releasably receive and retain a respective spreader passage sealing element.

17. A shaft assembly including:
(a) an elongated shaft extending along a shaft longitudinal axis and having a cylindrical shaft outer surface; and
(b) two or more shaft-mountable wheels mounted on the shaft, each shaft-mountable wheel including:
  (i) separate first and second wheel body components each defining a respective wheel body component opening extending along a respective wheel body component longitudinal axis from an inner end to an outer end of the respective wheel body component, the first and second wheel body components residing in a connected position with the inner end of the first wheel body component facing the inner end of the second wheel body component and with the respective wheel body component longitudinal axis aligned with the shaft longitudinal axis;
  (ii) an inwardly facing first compression surface defining a portion of the first wheel body component opening, the inwardly facing first compression surface tapering narrower in the direction from the inner end of the first wheel body component to the outer end of the first wheel body component;
  (iii) a drive feature projecting from at least one of an outer circumferential surface of the first wheel body component and an outer circumferential surface of the second wheel body component; and
  (iv) a hollow sleeve extending along a sleeve longitudinal axis and having a sleeve first section received in a sleeve first section operating position within the first wheel body component with the sleeve longitudinal axis aligned with the shaft longitudinal axis, the sleeve first section having an inwardly facing shaft gripping surface and an outwardly facing loading surface, the loading surface of the sleeve first section being tapered along the sleeve longitudinal axis and the shaft gripping surface of the sleeve first section defining a portion of a shaft receiving passage through the sleeve, wherein with the first and second wheel body components of the respective shaft-mountable wheel in the connected position with the sleeve first section received in the sleeve first section operating position within the first wheel body component, the first compression surface of the first wheel body component presses against the loading surface of the sleeve first section with a sleeve first section gripping force which compresses the shaft gripping surface of the sleeve first section against the shaft outer surface to essentially fix the respective shaft-mountable wheel on the shaft.

18. A method of securing a shaft-mountable wheel to a cylindrical shaft, the method including:
(a) sliding a hollow sleeve along a shaft longitudinal axis of the cylindrical shaft to a desired wheel position, the sleeve having a sleeve first section that includes an inwardly facing shaft gripping surface and an outwardly facing loading surface, the loading surface being tapered along a sleeve longitudinal axis that is aligned with the shaft longitudinal axis when the sleeve is in the desired wheel position;
(b) sliding first and second wheel body components longitudinally with respect to the cylindrical shaft to a capture position in which the sleeve in the desired wheel position is captured between the first and second wheel body components with an inner end of the first wheel body component facing an inner end of the second wheel body component and with an inwardly facing first compression surface of the first wheel body component abutting at least a portion of the loading surface of the sleeve first section and with a drive feature projecting from at least one of an outer circumferential surface of the first wheel body component and an outer circumferential surface of the second wheel body component; and
(c) connecting the first and second wheel body components together with a connection force applied parallel to the shaft longitudinal axis, the connection force causing the first compression surface to press against the loading surface of the sleeve first section and thereby cause the shaft gripping surface of the sleeve first section to apply a gripping force to the cylindrical shaft sufficient to fix the sleeve, and first and second wheel body components relative to the cylindrical shaft.

19. The method of claim 18 wherein sliding the hollow sleeve longitudinally along the cylindrical shaft to the desired wheel position and sliding the first and second wheel body components longitudinally with respect to the cylindrical shaft to the capture position are performed simultaneously.

20. The method of claim 18 wherein connecting the first and second wheel body components together with the connection force simultaneously forms (i) a first seal between the inner end of the first wheel body component and the inner end of the second wheel body component, (ii) a second seal between the first wheel body component and the sleeve, and (iii) a third seal between the sleeve and the cylindrical shaft.

* * * * *